United States Patent
Sucharitakul

(10) Patent No.: US 7,454,571 B1
(45) Date of Patent: Nov. 18, 2008

(54) HEURISTIC CACHE TUNING

(75) Inventor: Akara Sucharitakul, Foster City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 300 days.

(21) Appl. No.: 10/838,488

(22) Filed: May 4, 2004

(51) Int. Cl.
*G06F 12/02* (2006.01)

(52) U.S. Cl. .................. 711/129; 711/118; 711/170; 711/173

(58) Field of Classification Search ................ 711/118, 711/129, 170, 173
See application file for complete search history.

(56) References Cited

U.S. PATENT DOCUMENTS

| | | | |
|---|---|---|---|
| 5,305,389 A * | 4/1994 | Palmer | 382/305 |
| 5,893,920 A * | 4/1999 | Shaheen et al. | 711/133 |
| 6,467,024 B1 * | 10/2002 | Bish et al. | 711/114 |
| 6,591,272 B1 | 7/2003 | Williams | |
| 6,918,013 B2 | 7/2005 | Jacobs et al. | |
| 2002/0069323 A1 | 6/2002 | Percival | |
| 2003/0028682 A1 | 2/2003 | Sutherland | |
| 2003/0182307 A1 * | 9/2003 | Chen et al. | 707/103 X |
| 2004/0003298 A1 * | 1/2004 | Luick | 713/300 |
| 2005/0080994 A1 * | 4/2005 | Cohen et al. | 711/118 |
| 2006/0123199 A1 | 6/2006 | White et al. | |

OTHER PUBLICATIONS

"Cache Optimization Strategies for Entity Beans," JavaOne, Presentaion giving at JavaOne '03, Jun. 10, 2003, 31 pages.
"Enterprise JavaBeans™ Specification, Version 2.1", Sun Microsystems, Nov. 12, 2003, 646 pages.
"JDBC™ 3.0 Specification," Final Release, Ellis and Ho, Sun Microsystems, Oct. 2001, 189 pages.
"Java™ Data Objects," JSR 12, Version 1.0.1, Sun Microsystems, Inc. May 31, 2003, 200 pages.

* cited by examiner

*Primary Examiner*—Hong Kim
*Assistant Examiner*—Jae U Yu
(74) *Attorney, Agent, or Firm*—Lawrence J. Merkel; Meyertons, Hood, Kivlin, Kowert & Goetzel, P.C.

(57) ABSTRACT

In some embodiments, a computer system comprises a cache configured to cache data. The computer system is configured to monitor the cache and data that is potentially cacheable in the cache to accumulate a plurality of statistics useable to identify which of a plurality of data lifecycle patterns apply to the data. The computer system is also configured to modify a cache configuration of the cache dependent on which of the plurality of data lifecycle patterns apply to the data.

17 Claims, 5 Drawing Sheets

| Category | Pattern | Caching Rule(s) | Statistics |
|---|---|---|---|
| Create & Forget | Object Active for Relatively Short Time, then no Longer Used | 1. If object reuse time > time to live, don't cache<br>2. If feasible size of cache doesn't permit time to live long enough, disable cache | Object Reuse Time, Object Creation Rate |
| Lookup | High Object Reuse Rate, Low Creation Rate | 1. If table of objects fits in cache, cache the table<br>2. If frequently reused objects plus desired reserved space fits in cache, cache<br>3. If not 1 or 2, disable cache | Object Reuse Rate, Object Creation Rate, # of Frequently Reused Objects |
| Concurrent Updates | High Concurrent Update Rate, OCC Causes Frequent Transaction Rollback | 1. Use Lookup Rules<br>2. Use PCC<br>3. Do not cache object if it does not hit in the same transaction | Concurrent Update Rate, OCC Rollback Rate |
| Grow and Reuse | Low Concurrent Update Rate, Cache Characteristics Vary | 1. If growth rate < threshold, use Lookup rules<br>2. If growth rate > threshold, use Create & Forget Rules | Same as Lookup and Create & Forget, Concurrent Update Rate, Object Growth Rate |
| Queue | Objects Created, Processed, and Removed | 1. If product of object creation rate and object lifetime <= cache size, cache<br>2. If not 1, don't cache | Object Creation Rate, Object Lifetime |

HEURISTIC CACHE TUNING

BACKGROUND OF THE INVENTION

1. Field of the Invention

This invention is related to the field of caching data among servers and clients and, more particularly in some embodiments, to caching entity beans and tuning the cache.

2. Description of the Related Art

In a client-server architecture, caching of data provided by a server may be desirable. When multiple tiers are employed (e.g. an application server tier, a database tier, etc.), caching may be even more desirable as the caching at one tier may offload another tier. For example, caching of database data at the application server tier may offload the database tier if a database request hits in the cache, since the cached data may be used instead of forwarding the request to the database tier. If the caching is successful at offloading the database tier, less expensive computer systems may be used in the database tier or the database tier may serve a larger ("wider") application server tier.

On the other hand, caching also requires the allocation of system resources (storage, CPU cycles to execute the software that manages the cache, etc.). If too much resources are allocated to caching in a given computer system, the performance of that computer system on other tasks may suffer. Additionally, the implementation of caching may be complex in some cases. Accordingly, if caching is not effective (e.g. the cache hit rate is low), the costs of implementing the caching may outweigh the benefits.

Typically, caches are manually created and adjusted through a process of trial and error. The manual adjustment process leads either to a configuration that provides acceptable performance or to the elimination of caching if the resource consumption of caching increases costs to an unacceptable level without providing an acceptable performance level. Once the manual adjustment process is complete, typically the cache is not adjusted again until performance is severely impacted. However, workloads in the system may change characteristics over time, making the cache less effective but not necessarily causing enough performance degradation to warrant repeating the manual process.

SUMMARY OF THE INVENTION

In some embodiments, a computer system comprises a cache configured to cache data. The computer system is configured to monitor the cache and data that is potentially cacheable in the cache to accumulate a plurality of statistics useable to identify which of a plurality of data lifecycle patterns apply to the data. The computer system is also configured to modify a cache configuration of the cache dependent on which of the plurality of data lifecycle patterns apply to the data.

In other embodiments, a computer accessible medium comprises a plurality of instructions which, when executed: monitor a cache and data that is potentially cacheable in the cache to accumulate a plurality of statistics useable to identify which of a plurality of data lifecycle patterns apply to the data; and modify a cache configuration of the cache dependent on which of the plurality of data lifecycle patterns apply to the data. A similar method is also contemplated.

BRIEF DESCRIPTION OF THE DRAWINGS

The following detailed description makes reference to the accompanying drawings, which are now briefly described.

FIG. 4 is a table illustrating one embodiment of a set of categories of cached data.

Figure 1:
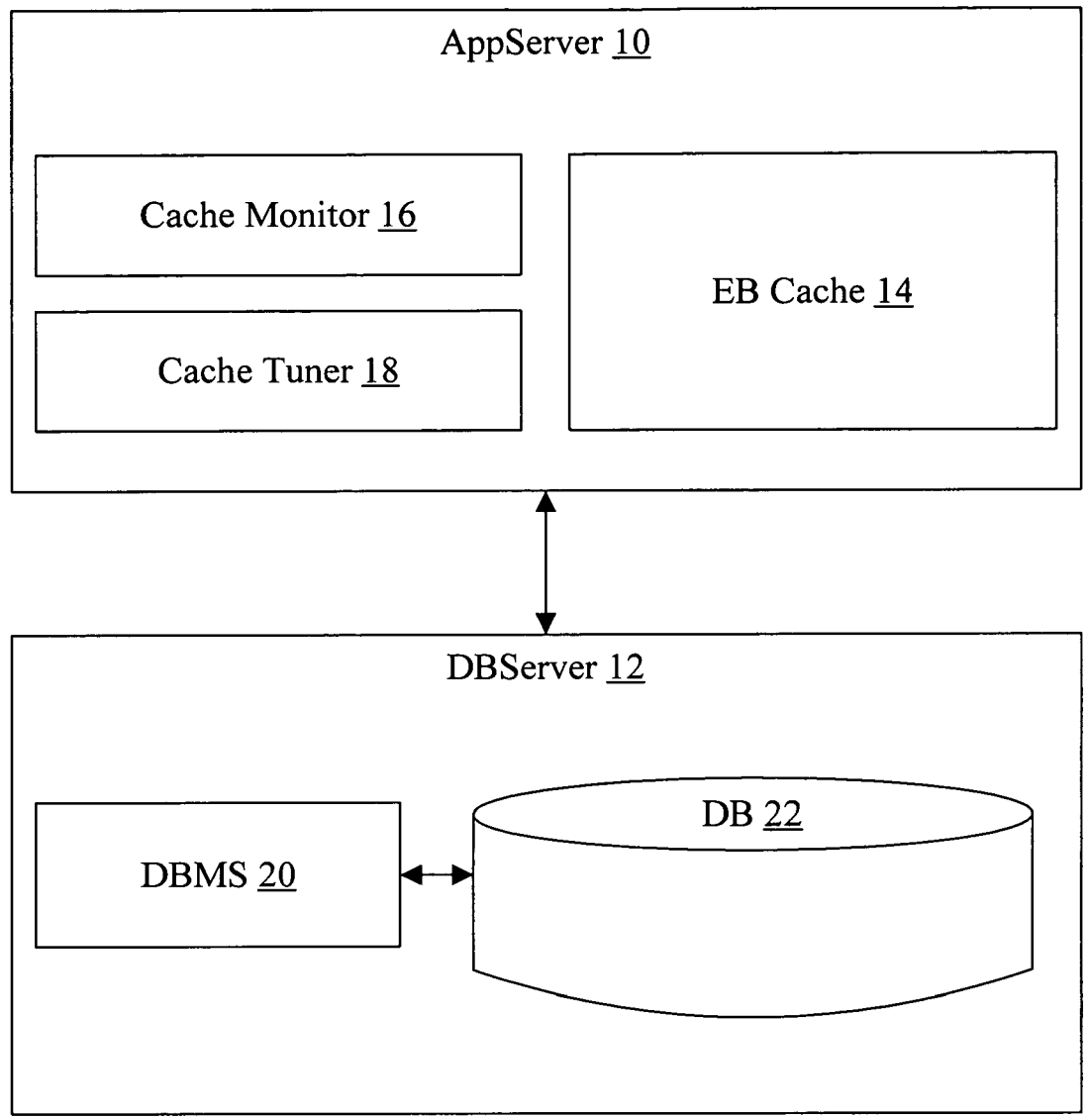
FIG. 1 is a block diagram of one embodiment of an application server and a database server.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of an application server (AppServer) 10 coupled to a database server (DBServer) 12 is shown. In the illustrated embodiment, the AppServer 10 includes an entity bean cache (EB cache) 14, a cache monitor 16, and a cache tuner 18. In the illustrated embodiment, the DBServer 12 includes a database management system (DBMS) 20 and a database (DB) 22.

The EB cache 14 may cache data from the DBServer 12 that has previously been accessed by the AppServer 10 (either on behalf of a client, not shown in FIG. 1, or an application executing on the AppServer 10). In the present embodiment, the AppServer 10 may use entity beans to interact with the database 22. Entity beans are program objects written in the Java™ language. An instance of an entity bean is mapped to a row of a table in the database 22, and may encapsulate one or more methods to be performed on the row. The EB cache 14 may cache entity bean objects. In some such embodiments, the Java™ Database Connectivity (JDBC) interface may be used to communicate with the DBServer 12. Alternatively, in some embodiments, the AppServer 10 may support an application programming interface (API) in which a reference to a row is supplied to the layer that maps entity beans to rows, and the EB cache 14 may cache the data corresponding to various entity beans.

The cache monitor 16 monitors the cache 14 and potentially cacheable objects such as entity beans during operation. More particularly, the cache monitor 16 may be configured to accumulate various statistics that may be used to identify data lifecycle patterns for entity beans in the cache 14. The data lifecycle patterns are predefined, and a corresponding category may be associated with each data lifecycle pattern. The category may include one or more caching rules that may be applied to the cache 14 and/or the caching of data in the cache 14 to effectively cache entity beans in that category. Additionally, in some embodiments, the cache monitor 16 may measure the cache hit rate of the cache 14 and/or may accumulate other statistics as desired. An exemplary set of data lifecycle patterns and categories are shown in FIG. 4 and described in more detail below.

The cache tuner 18 may modify the configuration of the cache 14 based on the statistics accumulated by the cache monitor 16. In this manner, the cache 14 may automatically be tuned to the category of entity beans that are being used by the AppServer 10. The cache 14 may adapt to changing data lifecycle patterns (e.g. due to changes in the workload of the AppServer 10 or clients thereof). Cache performance (e.g. cache hit rates) may be improved by modifying the cache configuration based on the detected patterns/categories to more efficiently cache the entity beans. In other cases, the cache configuration may be changed to disable caching so that resources are not consumed (e.g. if the entity beans may not be effectively cached using available resources on the AppServer 10). In some embodiments, the cache monitor 16 may continue to monitor and accumulate statistics even if caching is disabled, to permit cache tuning at a later time if caching becomes desirable again. Either the cache 14 may be disabled, or caching of entity beans in the corresponding category may be disabled but entity beans in other categories may be enabled. In some embodiments, the cache tuner 18 may check the to see if the current cache configuration is providing an acceptable level of performance (e.g. a cache hit rate above a desired threshold) before changing the configuration of the cache 14, even if a new category or categories of entity beans are detected.

As used herein, the "cache configuration" may include any characteristics of the cache 14 that may be modified to change the behavior of the cache 14. For example, in some embodiments, each category may include a set of one or more caching rules that may control the caching of data in that category. The cache tuner 18 may change the cache configuration to cause the cache 14 to implement the caching rules corresponding to a given category. Other characteristics may include the size of the cache 14 (e.g. in terms of numbers of entity bean objects that may be cached), whether or not the cache 14 is enabled, etc.

As used herein, a "data lifecycle pattern" may refer to any identifiable pattern of behavior that may be associated with cached data. The data lifecycle pattern may include its cache behavior, and may also include its lifecycle behavior (e.g. creation, use rate, pattern of use, etc.). Various statistics may be accumulated to detect data lifecycle patterns. For example, statistics related to the cache behavior may include one or more of: monitoring for cache puts from entity creations, cache puts from finds (that is, the object exists and is read from the database), cache gets (both hits and misses), cache deletes due to entity deletion, cache deletes due to operation errors, cache evictions due to capacity pressure, cache evictions due to timeout of the data, etc. Statistics related to lifecycle events may include one or more of: entity creation rate, entity find rate, entity deletion rate, etc. Additional statistics specific to exemplary data lifecycle patterns may also be accumulated to help identify such patterns. Some examples of such statistics are provided with respect to FIG. 4 below.

The cache 14 may comprise storage (e.g. random access memory (RAM), disk storage, etc.) that may be allocated to the cache 14. In one embodiment, the cache 14 may be a software-managed cache. Cache management software (not shown in FIG. 1) may be executed to manage the cache (e.g. managing replacement of objects in the cache, evicting objects to the database 22, if necessary, and loading objects into the cache). In other embodiments, the cache 14 may be hardware-managed. In still other embodiments, a combination of hardware and software may manage the cache 14.

In one embodiment, the cache monitor 16 and the cache tuner 18 may comprise software (that is, a plurality of instructions which, when executed, implement the function described for the cache monitor 16 and/or the cache tuner 18). In other embodiments, one or both of the cache monitor 16 and the cache tuner 18 may be implemented in hardware, or a combination of hardware and software.

The cache monitor 16 may execute continuously (although it may be scheduled with other tasks in a multi-tasking environment), or may be executed at each cache access to the cache 14, to monitor the cache 14 and detect various statistics. In some embodiments, the cache tuner 18 may be scheduled for execution periodically. The period may be varied in various embodiments and may generally be configurable based, e.g., on the expected changes in workload that may make cache configuration changes desirable. For example, the period may be once an hour, once per day, once per week, etc. In one embodiment, the cache tuner 18 may be scheduled for execution more frequently when the AppServer 10 is first deployed, and then less frequently over time (as the cache configuration settles to the workload typically experienced on the AppServer 10). If the configuration of the AppServer 10 changes (e.g. new applications are installed, applications are deleted, etc.), the cache tuner 18 may again be scheduled more frequently initially, and then less frequently as the cache configuration settles. In another embodiment, the cache tuner 18 may be scheduled by the cache monitor 16 (directly or indirectly) responsive to the cache monitor 16 detecting that a different pattern (different category) has been detected, or the different pattern/category has been detected often enough to warrant possible cache tuning.

The DBMS 20 may comprise any database management system. In some embodiments, the DBMS 20 may comprise a relational database management system and the database 22 may be a relational database. Generally, each of the AppServer 10 and the DBServer 12 may generally comprise any combination of software and computer system hardware that provides the specified functionality as described above. The computer system hardware generally includes one or more processors to execute the instructions forming the software, and may include any other hardware as desired (e.g. RAM memory, peripheral devices, etc.). In some embodiments, the AppServer 10 and the DBServer 12 may each be implemented on separate computer systems that may be coupled in any desired fashion. For example, the computer systems implementing the AppServer 10 and the DBServer 12 may be coupled via any type of network, such as an intranet, an extranet, the Internet, a local area network (LAN), a metropolitan area network (MAN), a wide area network (WAN), a wireless network, etc., or any combination thereof. Each of the AppServer 10 and the DBServer 12 may be implemented on one or multiple computer systems. In another example, the AppServer 10 and/or the DBServer 12 may comprise only software, and may be executed on the same underlying computer system in some embodiments.

While the description herein uses caching of entity beans (or data corresponding to entity beans) as an example, other embodiments may cache any sort of data (e.g. database data, or other types of data). While a DBServer is used as an example, caching of any other type of data may be implemented in other embodiments (e.g. web pages from webservers, files or portions of files from file servers, email from email servers, etc.). Additionally, the cache 14, cache monitor 16, and cache tuner 18 may be implemented at any tier in any client-server architecture (e.g. on a client, on a database server or other server, etc.).

Figure 2:
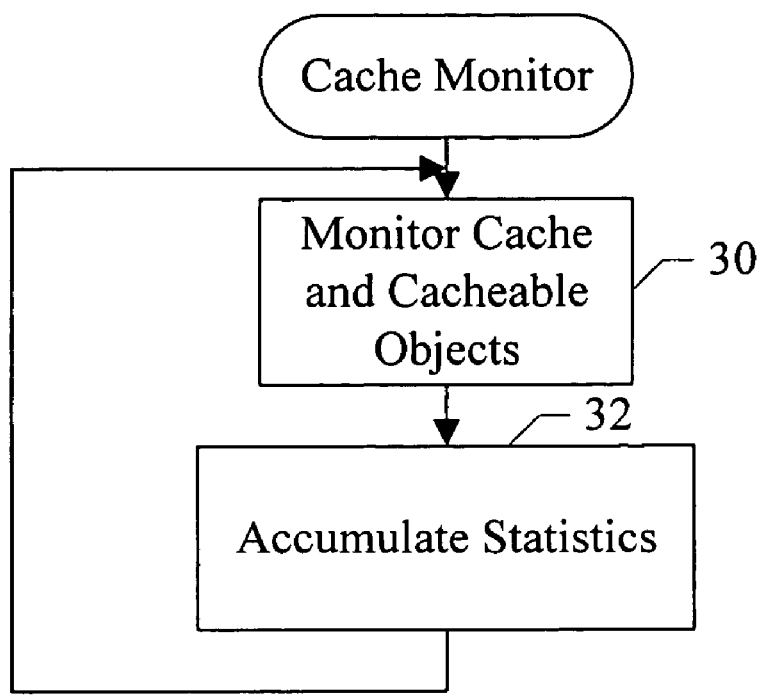
FIG. 2 is a flowchart illustrating operation of one embodiment of a cache monitor on the application server shown in FIG. 1.

Turning now to FIG. 2, a flowchart is shown illustrating operation of one embodiment of the cache monitor 16. In embodiments in which the cache monitor 16 is implemented in software, the blocks shown in FIG. 2 may represent instructions which, when executed, implement the function represented in the blocks.

The cache monitor 16 may monitor the operation of cache 14 and various potentially cacheable objects (either objects that are being cached, or objects that may be cacheable but are not being cached, such as when the cache 14 is disabled for a given type of object) (block 30). The cache monitor 16 may accumulate statistics that may be used by the cache tuner 18 to identify data lifecycle patterns and modify the cache configuration based on the identified data lifecycle patterns (block 32). Examples of such statistics for one embodiment have been noted above with regard to FIG. 1 and are described in more detail below with regard to FIG. 4. The cache monitor 16 may continue monitoring the cache and accumulating statistics as operation continues.

Figure 3:
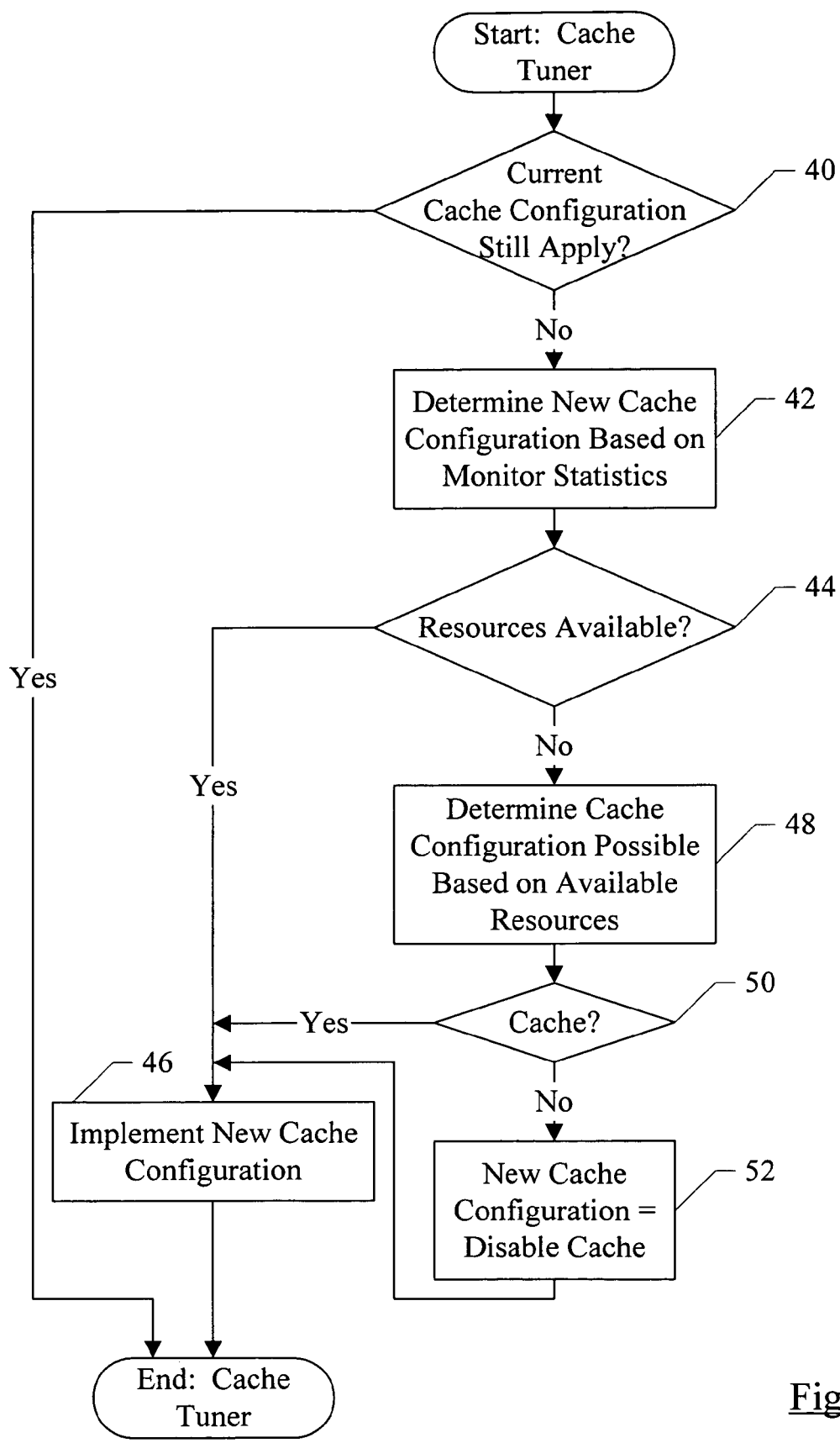
FIG. 3 is a flowchart illustrating operation of one embodiment of a cache tuner on the application server shown in FIG. 1.

Turning now to FIG. 3, a flowchart is shown illustrating operation of one embodiment of the cache tuner 18. In embodiments in which the cache tuner 18 is implemented in software, the blocks shown in FIG. 3 may represent instructions which, when executed, implement the function represented in the blocks.

The cache tuner 18 may determine if the current cache configuration still applies (decision block 40). The current cache configuration may still apply if the statistics detected by the cache monitor 16 continue to indicate the same data lifecycle patterns/categories previously detected by the cache monitor 16 (e.g. the last time that the cache tuner 18 attempted tuning). In some embodiments, the current cache configuration may still apply if the cache hit rate is higher than a threshold level, even if the statistics might indicate a different data lifecycle pattern than the previously detected patterns. That is, if the cache hit rate is high enough, then the current cache configuration may be providing acceptable performance, and tuning of the configuration may not be required. For example, the threshold for the cache hit rate may be about 90% in some embodiments. That is, if the cache hit rate is higher than 90%, then the cache configuration may be viewed as still applying. Other embodiments may have higher or lower cache hit rates as the threshold (e.g. 85%, 95%, etc.). In the illustrated embodiment, if the current cache configuration still applies (decision block 40, "yes" leg), the cache tuner 18 may exit.

On the other hand, if the current cache configuration is determined not to apply (decision block 40, "no" leg), the cache tuner 18 may determine a new cache configuration based on statistics compiled by the cache monitor 16 (block 42). The compiled statistics may include category-specific statistics, as well as non-specific statistics such as the size of the objects being accessed, the frequency of access, etc. The new cache configuration may include, e.g., a new size of the cache 14, whether or not caching is enabled (either globally or for a given category), etc.

The new cache configuration consumes a certain amount of resources on the caching computer system (e.g. the cache size may consume some amount of storage, the cache rules to be applied may consume a certain number of processor cycles to execute software to apply the rules, etc.). The cache tuner 18 may verify that the amount of resources to be consumed are available on the caching computer system (decision block 44). If the resources are available (decision block 44, "yes" leg), the cache tuner 18 may implement the new cache configuration (block 46). The cache tuner 18 may, for example, inform the cache management software/hardware for the cache 14 of the new cache configuration.

If the resources for the desired cache configuration are not available (decision block 44, "no" leg), the cache tuner 18 may determine the cache configuration that may be implemented given the available resources (block 48). For example, if the cache configuration is limited by the amount of storage available for the cache, the cache tuner 18 may reduce the capacity of the cache to the amount of available storage. If the cache configuration determined at block 48 would still lead to acceptable cache performance (decision block 50, "yes" leg), the cache tuner 18 may implement that cache configuration (block 46). For example, if the capacity of the cache is reduced but would still provide an acceptable cache hit rate, the cache tuner 18 may implement the cache configuration. If the cache configuration determine at block 48 would not lead to acceptable cache performance (decision block 50, "no" leg), the cache tuner 18 may determine that the new cache configuration is to disable caching (block 52).

It is noted that, while the above discussion describes implementing a cache configuration corresponding to a detected data lifecycle pattern/category, in some embodiments multiple patterns/categories may be detected concurrently. In some embodiments, the cache configuration may be a combination of cache configurations corresponding to the detected patterns/categories. For example, caching of some categories may be disabled with the cache size is determined by the desired cache sizes for other categories. Alternatively, the cache 14 may be partitioned into partitions for each detected pattern/category, and the cache configuration corresponding to each detected pattern/category may be applied to the corresponding partition. In yet another alternative, separate caches 14 may be established for each detected category.

Turning now to FIG. 4, a table 60 is shown illustrating one embodiment of data lifecycle patterns/categories that may be implemented in one embodiment of the cache monitor 16 and the cache tuner 18. The embodiment shown may be used for caching objects from the database. Other embodiments may implement any desired set of data lifecycle patterns/categories, including subsets or supersets of the patterns/categories shown in FIG. 4. Each entry in the table 60 includes a category name ("category" heading), a description of the data lifecycle pattern ("pattern" heading), a set of one or more caching rules that may be part of the cache configuration used for that category ("Caching Rule(s)" heading), and one or more category-specific statistics that may be accumulated by the cache monitor 16 and may be used to determine/detect that category ("Statistics" heading).

The first category listed in the embodiment of FIG. 4 is the create & forget category. The pattern corresponding to the create & forget category is an object that is active (that is, being referenced) for a relatively short time after the object is created, after which the object is typically no longer used. An example of a create & forget object may be a customer order. A customer order may be created when a customer places the order, and may be referenced during the order fulfillment process (such as an assembly line or in a warehouse). Subsequent to fulfilling the order, the customer order may not be referenced again in the near term but may be retained in the database as a record of the transaction.

A create & forget object may have a "time-to-live" in the cache 14 based on the creation rate of create & forget objects and the capacity of the cache 14. For example, if the cache 14 may cache "m" objects and the object creation rate is "n" objects per unit of time, the time-to-live (TTL) may be calculated as shown in equation 1:

$$TTL = m/n \qquad (1)$$

Given a capacity of the cache, if create & forget objects are not "reused" (e.g. read or written) during the time-to-live, then the objects may typically be deleted from the cache prior to being reused and thus a low cache hit rate may result. The cache tuner 18 may attempt to size the cache 14 such that the TTL exceeds the object reuse time, in some embodiments. The caching rules for create & forget objects may include not caching a create & forget object if the object reuse time is greater than the TTL of the object. Different create & forget objects (e.g. different entity beans) may have different object reuse times, and thus some objects may be cached while other are not. The caching rules may also include disabling caching if the feasible size of the cache (e.g. based on available resources) doesn't permit a TTL long enough to exceed the object reuse time of the create & forget objects. In this embodiment, statistics accumulated that correspond to the create & forget category may include the object reuse time (or times, for multiple types of create & forget objects such as multiple entity beans) and the object creation rate (or rates).

A second category in the table 60 is the lookup category. The pattern corresponding to the lookup category may be objects with a high reuse rate and a low creation rate. For example, thresholds may be specified for the object reuse rate and the object creation rate, and if the object reuse rate exceeds the corresponding threshold and the object creation rate does not exceed the corresponding threshold, then the lookup category may be detected. In some embodiments, one of the thresholds may be measured relative to the other (e.g. the object creation rate threshold may be relative to the measured object reuse rate, or vice versa). An example of a database structure that may be in the lookup category may be a catalog. A catalog may frequently be read (e.g. by customers or order entry clerks) but may only be updated as products are changed, added to the catalog, or deleted from the catalog.

Caching rules for the lookup category may include, if the table in the database of objects categorized in the lookup category fits in the cache 14, then the table may be cached. Additionally, if the table cannot be cached but the number of frequently reused lookup objects plus a desired reserve space (to be occupied by less frequently reused objects) fits in the cache 14, then the lookup objects may be cached. In some embodiments, the cache tuner 18 may attempt to size the cache 14 to cache the table or the number of frequently reused objects plus the desired reserve space. If neither of the above two rules is satisfied, the cache 14 may be disabled (or the lookup category objects may not be cached). The cache monitor 14 may accumulate the following statistics that correspond to lookup objects: object reuse rate, the objection creation rate, and the number of frequently reused objects.

A third category in the table 60 is the concurrent updates category. The pattern corresponding to the concurrent updates category may be a high concurrent object update rate (frequent concurrent updates), and also that optimistic concurrency control (OCC) policies cause frequent transaction rollbacks. With OCC, the client presumes that no other client has access to the data to be updated, and verifies that the data has not changed in the underlying database when attempting to commit a transaction (but not while making uncommitted updates in the transaction). In contrast, with pessimistic concurrency control (PCC), the client presumes that other clients are accessing the data to be updated, and may ensure that the data has not changed in the underlying database by using locks. Concurrent updates are updates from multiple sources (multiple clients) that occur at approximately the same time (e.g. the transactions which cause the updates overlap each other in time). If one client updates the object (particularly, the data from the database that is mapped to an object), then the copy of the data in other clients may be stale. An example of the concurrent updates category may be an inventory table, which may be updated as various users move inventory in and out.

Caching rules for the concurrent updates category may include rules similar to the lookup category, and also using PCC (where OCC might be used in other categories). Additionally, the caching rules may include not caching a "concurrent updates" object at all (e.g. if the corresponding data is not a hit for the same transaction. The statistics accumulated by the cache monitor 16 that correspond to the concurrent updates category may include the update rate and the OCC rollback rate, along with the lookup category statistics if the lookup category caching rules are used.

A fourth category shown in the table 50 is a grow and reuse category. The pattern corresponding to the grow and reuse category may include a low concurrent update rate and varying cache characteristics (that is, the cache configuration that provides high cache hit rates may vary over time). Additionally, the grow and reuse category may be characterized by growth in the number of objects over time, but the objects also experience reuse over time. An example of the grow and reuse category may be a customer database. Over time, the number of customers in the database may grow, and the customer entries may be used as customers place additional orders.

A threshold for the growth rate may be used for the grow and reuse category, as part of the caching rules. If the growth rate is less than the threshold, then the pattern may resemble the lookup category and the lookup caching rules may be used. If the growth rate exceeds the threshold, then the pattern may resemble the create & forget category and the create & forget caching rules may be used. The statistics accumulated by the cache monitor 14 that correspond to the grow and reuse category may include the lookup and create & forget statistics, as well as the concurrent update rate and the object growth rate.

A fifth category shown in the table 60 may be the queue category. The pattern corresponding to the queue category may be that objects are created, processed for a period of time, and then removed. The time between creation and removal may be defined as the object lifetime. Assuming that the object creation rate is approximately equal to the object removal rate, a caching rule may be to enable caching if the product of the object creation rate and the object lifetime is less than or equal to the cache size (in terms of numbers of objects). Caching may be disabled otherwise. In some embodiments, the cache tuner 18 may attempt to size the cache 14 to be greater than or equal to the product of the object creation rate and the object lifetime, or may disable caching of the queue category. If the product is less than or equal to the cache size, the objects may generally remain in the cache for their lifetimes, and thus cache hit rate may be high. The statistics accumulated by the cache monitor 14 that correspond to the queue category may include the object creation rate and the object lifetime.

It is noted that, while the cache monitor 16 and the cache tuner 18 are shown as separate blocks in the illustrated embodiment, the cache monitor 16 and the cache tuner 18 may be part of the same software, or separate software, in various embodiments. Additionally, in some embodiments, the cache monitor 16 and/or the cache tuner 18 may be configured to receive hints (e.g. from the entity bean designer, as part of the entity bean, or from a user or administrator) as to which category the beans/objects may belong. For example, the cache monitor 16 may receive the hint and may operate as if the data lifecycle pattern corresponding to the hinted category has been detected for the beans/objects.

Figure 5:
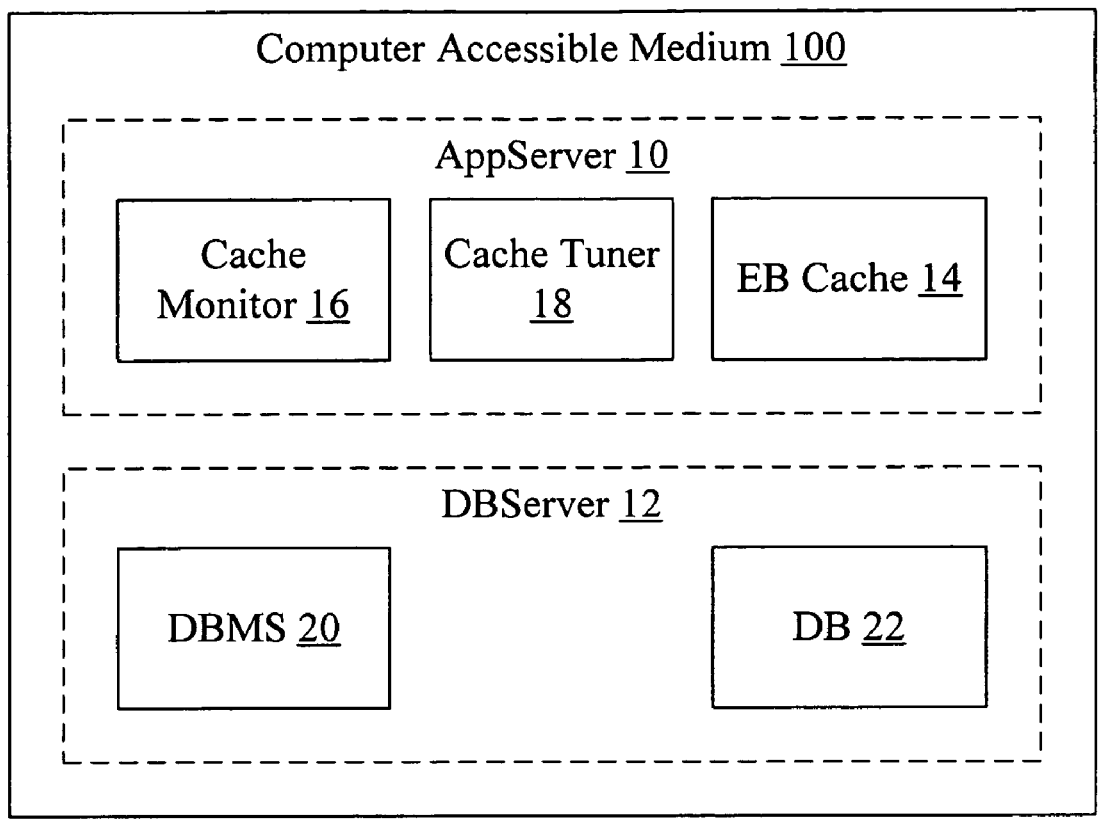
FIG. 5 is a block diagram of one embodiment of a computer accessible medium.

Turning now to FIG. 5, a block diagram of a computer accessible medium 100 is shown. Generally speaking, a computer accessible medium may include any media accessible by a computer during use to provide instructions and/or data to the computer. For example, a computer accessible medium may include storage media such as magnetic or optical media, e.g., disk (fixed or removable), tape drives, compact disk-ROM (CD-ROM), or digital versatile disk-ROM (DVD-ROM), CD-Recordable (CD-R), CD-Rewritable (CD-RW), DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. The computer accessible medium 100 in FIG. 5 may be encoded with the cache monitor 16 and/or the cache tuner 18. Generally, the computer accessible medium 100 may store any set of instructions which, when executed, implement a portion or all of the flowcharts shown in one or more of FIGS. 2 and 3. In some embodiments, the computer accessible media may include storage media in the AppServer 10. In some embodiments, the computer accessible medium may further store one or more of the EB cache 14, the DBMS 18, and/or the DB 22. In some embodiments, the computer accessible medium may further store the AppServer 10 and/or the DB server 12.

Numerous variations and modifications will become apparent to those skilled in the art once the above disclosure is fully appreciated. It is intended that the following claims be interpreted to embrace all such variations and modifications.

What is claimed is:

1. A computer accessible storage medium comprising a plurality of instructions which, when executed:
   monitor a cache and data that is potentially cacheable in the cache to accumulate a plurality of statistics usable to identify which of a plurality of data lifecycle patterns apply to the data;
   identify two or more of the plurality of data lifecycle patterns that occur concurrently; and
   modify a cache configuration of the cache dependent on which of the plurality of data lifecycle patterns apply to the data and further dependent on whether or not resources that would be consumed by the cache configuration are available for caching, and wherein the resources that would be consumed by the cache configuration are not currently consumed according to a current configuration of the cache and wherein, in response to identifying the two or more of the plurality of data lifecycle patterns that occur concurrently, modifying the cache configuration comprises modifying the cache configuration with a combination of modifications, each of the modifications corresponding to one of the concurrently identified data lifecycle patterns, and wherein modifying the cache with the combination of modifications comprises partitioning the cache into partitions, each partition corresponding to one of the two or more of the plurality of data lifecycle patterns and configured according to the one of the two or more of the plurality of data lifecycle patterns.

2. The computer accessible storage medium as recited in claim 1 wherein the cache configuration comprises a size of the cache.

3. The computer accessible storage medium as recited in claim 1 wherein the cache configuration comprises whether or not to cache data.

4. The computer accessible storage medium as recited in claim 1 wherein the plurality of instructions, when executed, measure a cache hit rate for the cache and wherein the plurality of instructions, when executed, modify the cache configuration dependent on the cache hit rate being lower than a threshold.

5. The computer accessible storage medium as recited in claim 1 wherein the plurality of instructions, when executed, analyze the plurality of statistics to determine which of the plurality of data lifecycle patterns apply to the data.

6. A method comprising:
   monitoring a cache and data that is potentially cacheable in the cache to accumulate a plurality of statistics usable to identify which of a plurality of data lifecycle patterns apply to the data;
   identify two or more of the plurality of data lifecycle patterns that occur concurrently; and
   modifying a cache configuration of the cache dependent on which of the plurality of data lifecycle patterns apply to the data and further dependent on whether or not resources that would be consumed by the cache configuration are available for caching, and wherein the resources that would be consumed by the cache configuration are not currently consumed according to a current configuration of the cache and wherein, in response to identifying the two or more of the plurality of data lifecycle patterns that occur concurrently, modifying the cache configuration comprises modifying the cache configuration with a combination of modifications, each of the modifications corresponding to one of the concurrently identified data lifecycle patterns, and wherein modifying the cache with the combination of modifications comprises partitioning the cache into partitions, each partition corresponding to one of the two or more of the plurality of data lifecycle patterns and configured according to the one of the two or more of the plurality of data lifecycle patterns.

7. The method as recited in claim 6 further comprising measuring a cache hit rate for the cache, wherein modifying the cache configuration is further dependent on the cache hit rate being lower than a threshold.

8. The method as recited in claim 6 further comprising analyzing the plurality of statistics to determine which of the plurality of data lifecycle patterns apply to the data.

9. A computer system comprising a cache configured to cache data, wherein the computer system is configured to monitor the cache and data that is potentially cacheable in the cache to accumulate a plurality of statistics usable to identify which of a plurality of data lifecycle patterns apply to the data, and wherein the computer system is configured to identify two or more of the plurality of data lifecycle patterns that occur concurrently, and wherein the computer system is configured to modify a cache configuration of the cache dependent on which of the plurality of data lifecycle patterns apply to the data and further dependent on whether or not resources that would be consumed by the cache configuration are available for caching, and wherein the resources that would be consumed by the cache configuration are not currently consumed according to a current configuration of the cache and wherein, in response to identifying the two or more of the plurality of data lifecycle patterns that occur concurrently, modifying the cache configuration comprises modifying the cache configuration with a combination of modifications, each of the modifications corresponding to one of the concurrently identified data lifecycle patterns, and wherein modifying the cache with the combination of modifications comprises partitioning the cache into partitions each partition corresponding to one of the two or more of the plurality of data lifecycle patterns and configured according to the one of the two or more of the plurality of data lifecycle patterns.

10. The computer system as recited in claim 9 wherein the cache configuration comprises a size of the cache.

11. The computer system as recited in claim 9 wherein the cache configuration comprises whether or not to cache data.

12. The computer system as recited in claim 9 wherein the computer system is further configured to measure a cache hit rate for the cache, and wherein the computer system is configured to modify the cache configuration dependent on the cache hit rate being lower than a threshold.

13. The computer accessible storage medium as recited in claim 1 wherein the plurality of instructions, when executed, in response to determining that the resources that would be consumed are not available, change the cache configuration to a different configuration that consumes only available resources.

14. The computer accessible storage medium as recited in claim 1 wherein the plurality of instructions, when executed, disable the cache if the different cache configuration cannot be supported by the available resources.

15. The computer accessible storage medium as recited in claim 1 wherein the cache configuration comprises one or more caching rules for data corresponding to the identified lifecycle pattern, and wherein the resources comprise processor cycles to execute the instructions that implement the caching rules.

16. The computer accessible storage medium as recited in claim 1 wherein the instructions that modify the cache configuration are scheduled to execute periodically, and wherein the length of the period is based on an expected workload on a computer system that executes the instructions.

17. The computer accessible storage medium as recited in claim 1 wherein the instructions that modify the cache configuration are scheduled to execute responsive to a request from the instructions that monitor the cache and the potentially cacheable data.

* * * * *